(12) United States Patent
Covington et al.

(10) Patent No.: US 7,392,644 B2
(45) Date of Patent: Jul. 1, 2008

(54) COTTON PACKAGER AND UNLOADER DOOR ARRANGEMENT FOR MOUNTING ON A CHASSIS OF A COTTON HARVESTER

(75) Inventors: Michael J. Covington, Bettendorf, IA (US); George H. Hale, Arlington, TN (US); Gary R. Gallens, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 266 days.

(21) Appl. No.: 11/095,257

(22) Filed: Mar. 31, 2005

(65) Prior Publication Data

US 2006/0218889 A1 Oct. 5, 2006

(51) Int. Cl.
*A01D 46/08* (2006.01)

(52) U.S. Cl. .............................. 56/28; 460/119; 414/111; 56/449

(58) Field of Classification Search ................. 460/119; 56/449, 344, 361, 430, 432, 28; 414/525.1, 414/537, 111, 24.5, 24.6; 100/188 R
See application file for complete search history.

(56) References Cited

U.S. PATENT DOCUMENTS

| | | | | |
|---|---|---|---|---|
| 2,003,287 A | | 6/1935 | Fitch | |
| 2,630,870 A | * | 3/1953 | Paul | 180/14.1 |
| 2,881,024 A | | 4/1959 | Saiberlich | 296/35 |
| 3,840,134 A | * | 10/1974 | Luscombe | 414/501 |
| 3,875,730 A | * | 4/1975 | Wood | 56/344 |
| 3,886,719 A | | 6/1975 | Garrison et al. | 56/344 |
| 3,894,646 A | | 7/1975 | Head et al. | 414/505 |
| 3,901,142 A | * | 8/1975 | Wood | 100/255 |
| 3,974,632 A | * | 8/1976 | Van der Lely | 56/341 |
| 3,990,739 A | * | 11/1976 | Head | 296/56 |
| 4,000,924 A | | 1/1977 | Blasingame | 296/35 A |
| 4,046,069 A | * | 9/1977 | Head | 100/255 |
| 4,072,242 A | * | 2/1978 | Cook | 414/505 |
| 4,793,126 A | | 12/1988 | Wood et al. | 56/16.6 |
| 4,888,940 A | | 12/1989 | Deutsch | 56/16.6 |
| 4,943,118 A | | 7/1990 | Davis | 298/12 |
| 4,969,690 A | | 11/1990 | Smith | 298/17 R |
| 5,540,144 A | * | 7/1996 | Schrag et al. | 100/188 R |
| 5,836,657 A | | 11/1998 | Tilley et al. | 298/1 A |
| 6,238,004 B1 | | 5/2001 | Hansen et al. | 298/17 T |
| 6,409,275 B1 | | 6/2002 | Gerding | 298/22 R |
| 6,431,062 B1 | * | 8/2002 | Hawlas et al. | 100/188 R |
| 6,478,523 B1 | * | 11/2002 | Meijer | 414/111 |
| 6,682,417 B2 | | 1/2004 | Covington et al. | 460/119 |
| 6,766,634 B2 | * | 7/2004 | Covington et al. | 56/480 |

(Continued)

*Primary Examiner*—Árpád Fábián Kovács
(74) *Attorney, Agent, or Firm*—Michael G. Harms; John William Stader; Patrick M. Sheldrake (57) ABSTRACT

A cotton packager for mounting on a chassis of a cotton harvester interchangeably with a cotton basket, allowing for pivotal movement of the packager between an operating position and a tilted unloading position. The packager includes a pivotable fluid cylinder which attaches to the chassis in place of a fixed front lift cylinder of the basket, and a rear pivot which attaches to the chassis in place of a rear lift cylinder. As a result, a rear open end of the packager can be lowered closer to a surface onto which cotton is to be unloaded, and drivers for an unloader door of the packager can be subjected to less damaging loads.

17 Claims, 8 Drawing Sheets

U.S. PATENT DOCUMENTS 6,969,315 B2 * 11/2005 Richman et al. ............ 460/119
2003/0211875 A1 * 11/2003 Covington et al. .......... 460/119
2003/0228894 A1 * 12/2003 Covington et al. .......... 460/119

* cited by examiner

COTTON PACKAGER AND UNLOADER DOOR ARRANGEMENT FOR MOUNTING ON A CHASSIS OF A COTTON HARVESTER

TECHNICAL FIELD

This invention relates generally to a cotton packager, and more particularly, to a packager and unloader door arrangement interchangeably mountable with a cotton basket on a chassis of a cotton harvester, and which provides enhanced unloading operation.

BACKGROUND ART

Cotton packagers, also commonly referred to as cotton module builders, and cotton receiving baskets, are structures commonly utilized on cotton harvesters for receiving and holding harvested cotton. A cotton packager will typically compact and package the cotton in a unitary body which will retain its shape once removed from the packager so as to be transportable in that form to a gin for processing or other location. A cotton basket, in contrast, may compact the cotton to increase the capacity of the basket, but when unloaded, typically dispenses the cotton in a less, or not at all, cohesive form. As another difference, it is typically desirable for a cotton packager to be tilted while remaining at the chassis level for unloading a completed unitary cotton package or module therefrom through a rear opening. The module is unloaded onto a ramp or other structure for conveying the package or module intact onto the ground or another surface lower than a floor of the packager. Therefore, the packager is typically supported and connected to the chassis at the front by at least one fluid cylinder and at the rear by a hinge or pivot. A cotton basket, on the other hand, is typically lifted in a horizontal orientation a substantial distance above the chassis using fluid cylinders located front and rear, and then the cotton unloaded therefrom either by tilting the basket in the elevated position, or by conveying the cotton through an open side door, into another basket or a module builder disposed beside the harvester or onto the ground or another surface. The basket is thus supported and connected to the chassis by two or more fluid cylinders, front and rear.

It is anticipated that some cotton producers will continue to utilize cotton baskets, which is an older technology, for economic reasons, preferences, and a possible lack of capability of transporting and handling cotton modules. Cotton packagers, which are newer, are expected to increase in popularity. However, presently, manufacturers of cotton harvesters desire to have the capability to produce harvesters having baskets or packagers. Cotton harvesters are produced on a relatively low volume basis. Therefore, for reasons including economic reasons and versatility of manufacturing, it would be desirable to use the same chassis configuration interchangeably with either a cotton packager or a basket.

It would also be advantageous when unloading, for the tilting movement of the packager to exert forces against an unloader door of the packager for urging it toward an unfolded unloading position, while reducing or minimizing occurrences of applying possibly damaging loads against components of the door, particularly extended fluid cylinders for unfolding the door.

It would also be desirable when the packager is tilted for unloading, for the rear end of the floor to be as closer to the ground or other surface below onto which the cotton module is to be unloaded. This is because the closer the rear end of the floor is to the ground when in the tilted unloading position, the shorter the doors need to be when unfolded to reach the ground for unloading the cotton module. This will also be an advantage in that the doors when folded in the closed position are below the height that would require their removal for shipping or transport.

Still further, compacting cotton into a unitary compacted module requires stronger and heavier apparatus compared to the apparatus for compacting cotton to the extent required in a basket. However, when the cotton is unloaded from the basket, it is moved out onto the unloading door and is cantilevered out from the lift cylinders. This produces combined torsion and bending loads in the lift cylinders, which requires them to be larger with larger rod ends and cylinder walls. By tilting the heavier structure of the packager, the loading is a less severe shear or direct compressive load.

Thus, what is sought is a cotton packager and unloader door configuration which is substantially interchangeable with a cotton basket for mounting on a chassis of a cotton harvester, and which provides enhanced unloading operability, and overcomes one or more of the problems or shortcomings set forth above.

SUMMARY OF THE INVENTION

What is disclosed is a cotton packager and unloader door configuration which can be interchangeable with a cotton basket for mounting on a chassis of a cotton harvester, and which provides at least some advantages and enhanced unloading operability, and overcomes one or more of the problems or shortcomings set forth above.

A typical chassis of the cotton harvester with which the invention is used includes structural elements having upper portions adapted for supporting a basket bottom or floor, and a rear end including at least one rear mounting element such as, but not limited to, a bracket, disposed so as to be located below the bottom or floor and adapted for connection of a lower end of a fluid cylinder thereto operable for raising a rear end of a basket. The chassis also includes at least one front mounting element or bracket at a forward location adapted for connecting a lower end of another fluid cylinder to the chassis operable for raising a front end of a basket.

According to a preferred aspect of the invention, the packager includes a cotton compacting structure including a cotton compacting chamber having an open end and a floor located in the chamber, the chamber containing compactor apparatus operable for compacting the cotton received in the chamber to form a unitary body of compacted cotton within the chamber. The compacting structure includes at least one pivot arm extending downwardly from a rear end of the bottom or floor of the cotton compacting structure beneath the open end of the chamber. The pivot arm includes a pivot positioned and adapted for connection to the rear mounting element or bracket of the chassis, in place of the fluid cylinder, to allow pivotal movement of the packager between a generally horizontal position with the floor supported on the top portions of the structural elements of the chassis, and a tilted position wherein a front end of a packager is elevated above the plane of the chassis and the rear end of the floor is located rearwardly of and below the upper portions of the structural elements of the chassis. The packager additionally includes a fluid cylinder having an upper end pivotally connected to a front end of the cotton compacting structure and a lower end pivotally connected to the front mounting element or bracket of the chassis, such that extension of the fluid cylinder will tilt the packager to the tilted position, and retraction will return it to the horizontal position. The packager additionally preferably includes a door arrangement on the rear end and operably movable between a closed position at least partially enclosing or covering the open rear end, and an open, unloading position forming a ramp extending downwardly from the floor of the cotton compacting chamber to a surface therebelow such as the ground, and over which ramp a compacted unitary body of cotton can be unloaded from the packager when in the tilted position.

As a result, the packager is configured to be more easily tilted to the unloading position. Also advantageously, the pivot about which the packager is pivoted between the horizontal and tilted positions, is located a predetermined distance below a pivotal connection of the door to the rear end of the packager, such that as the packager is being pivoted to the tilted position and the rear end lowered, forces can be applied against the door to facilitate unfolding thereof without application of undesirable loads on components thereof, particularly undesirable loads against the fluid cylinders used in opening and closing the doors.

DETAILED DESCRIPTION OF THE INVENTION

Figure 1:
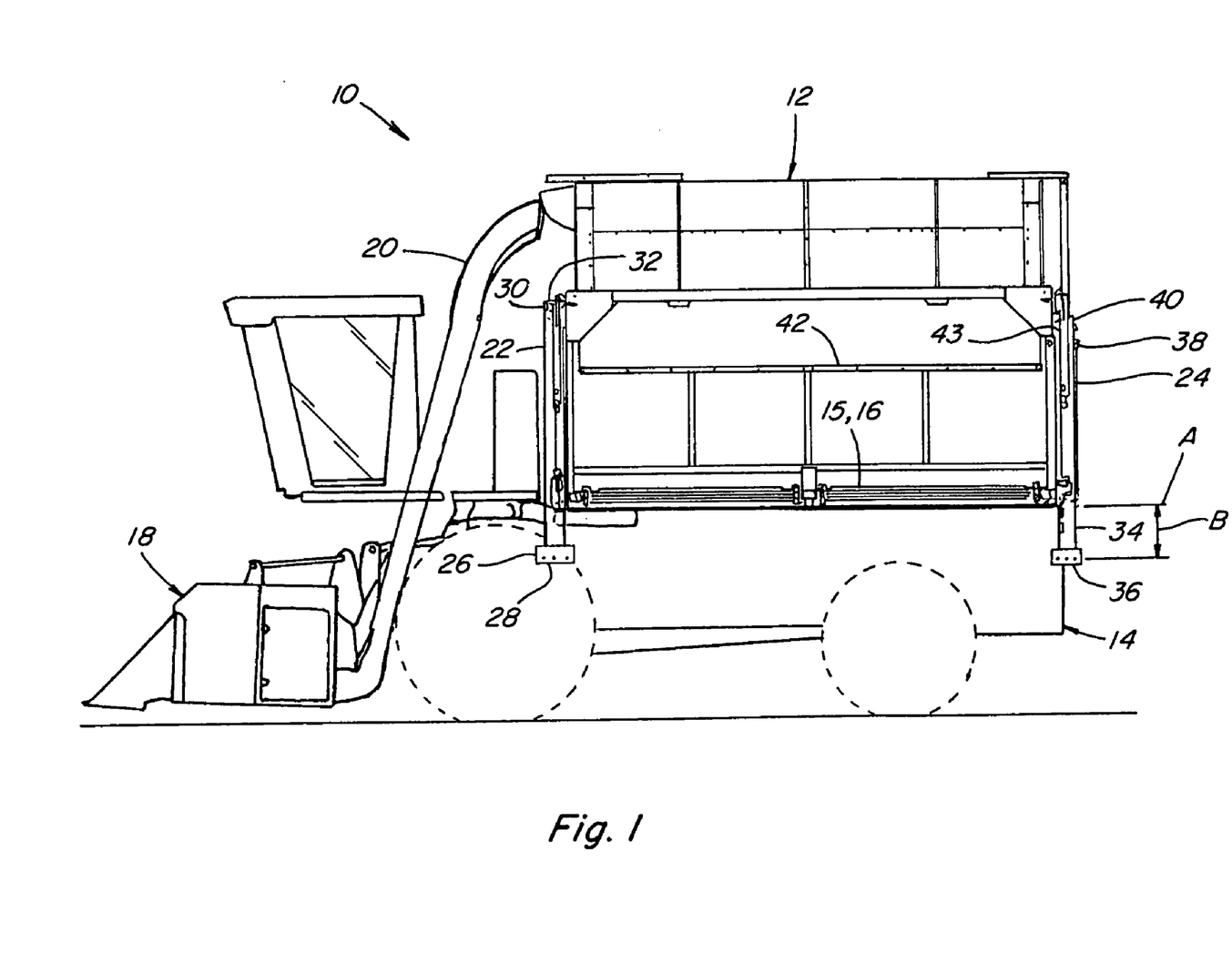
FIG. 1 is a side view of a conventional cotton receiving basket, shown in a horizontal operational position supported on a chassis of a self-propelled cotton harvester.

Referring now to the drawings, in FIG. 1, a conventional self-propelled cotton harvester 10 is shown including a conventional cotton receiving basket 12 supported on a chassis 14 of harvester 10. Chassis 14 is of conventional, well known construction, including one or more structural elements 15 having upper portions 16 defining a generally horizontal reference plane A on which basket 12 is supported or rests, also in the well known manner.

Generally, harvester 10 includes a plurality of individual harvesting row units 18 supported on a front end thereof and operable for removing cotton from cotton plants, as harvester 10 is moved forwardly through a cotton field. The harvested cotton is propelled by flows of air upwardly and rearwardly from row units 18 through ducts 20, to an upper end of an interior of basket 12. The cotton received in basket 12 settles in a lower region thereof, and basket 12 optionally includes compacting apparatus for compacting the cotton downwardly against a floor of basket 12, generally parallel to reference plane A. Then, when the basket is filled to capacity, or it is desired to cease the harvesting operation, basket 12 is unloaded. For unloading, basket 12 is connected to chassis 14 by a plurality of fluid cylinders, including at least one front fluid cylinder 22, and at least one rear fluid cylinder 24. Front fluid cylinder 22 has a lower end 26 that is pinned to a structure that mounts to bracket 28. Cylinder 22 has an upper rod end 30 connected to a front end of basket 12 by a front upper bracket 32. Similarly, rear fluid cylinder 24 has a lower end 34 that is pinned directly to bracket 36, disposed a predetermined distance B below plane A, and an upper rod end 38 connected to the rear end of basket 12 by a rear upper bracket 40. Predetermined distance B can have a value, for instance, in a range of from about 18 to about 22 inches, and front cylinder 22 can be disposed the same distance below plane A, such that the same stroke length can be used for cylinders 22 and 24. Cylinders 22 and 24 are master/slave cylinders with cylinder 22 as the larger master cylinder supplying fluid to the slave cylinder 24.

The connection of front fluid cylinder 22 between brackets 28 and 32, and the connection of rear fluid cylinder 24 between brackets 36 and 40, serve as the principal means for holding basket 12 on chassis 14. Extending cylinders 22 and 24 thus operates to raise basket 12 above horizontal plane A of chassis 14 into an unloading position, in the well known, conventional manner. It is not desirable for basket 12, or cylinders 22 and 24, when basket 12 is in the raised position, or being raised or lowered, to inadvertently sway or tilt. To facilitate this, a front rail or mast structure (not shown) is bolted to bracket 28 behind the front cylinder 22 and a left and right hand roller structure is mounted to the lower front of the basket 12 to track vertically on the rail as the basket 12 is lifted vertically. This prevents the front of the basket 12 and cylinder 22 from swaying or tilting. Additionally, to stabilize the rear of basket 12 during upward and downward movement and when unloading, rollers (not shown) which travel along cylinder 24 are provided. In the unloading position, a side unloader door 42 can be opened using unloader door cylinders 43. The cotton can then be unloaded by activating the unloading chains (not shown) that run along the basket floor and unloader door, also in the well known, conventional manner. After unloading, retracting unloader door cylinders 43 can close the unloader door 42 and cylinders 22 and 24 can be retracted to lower basket 12 down onto elements 15 of chassis 14.

Figure 2:
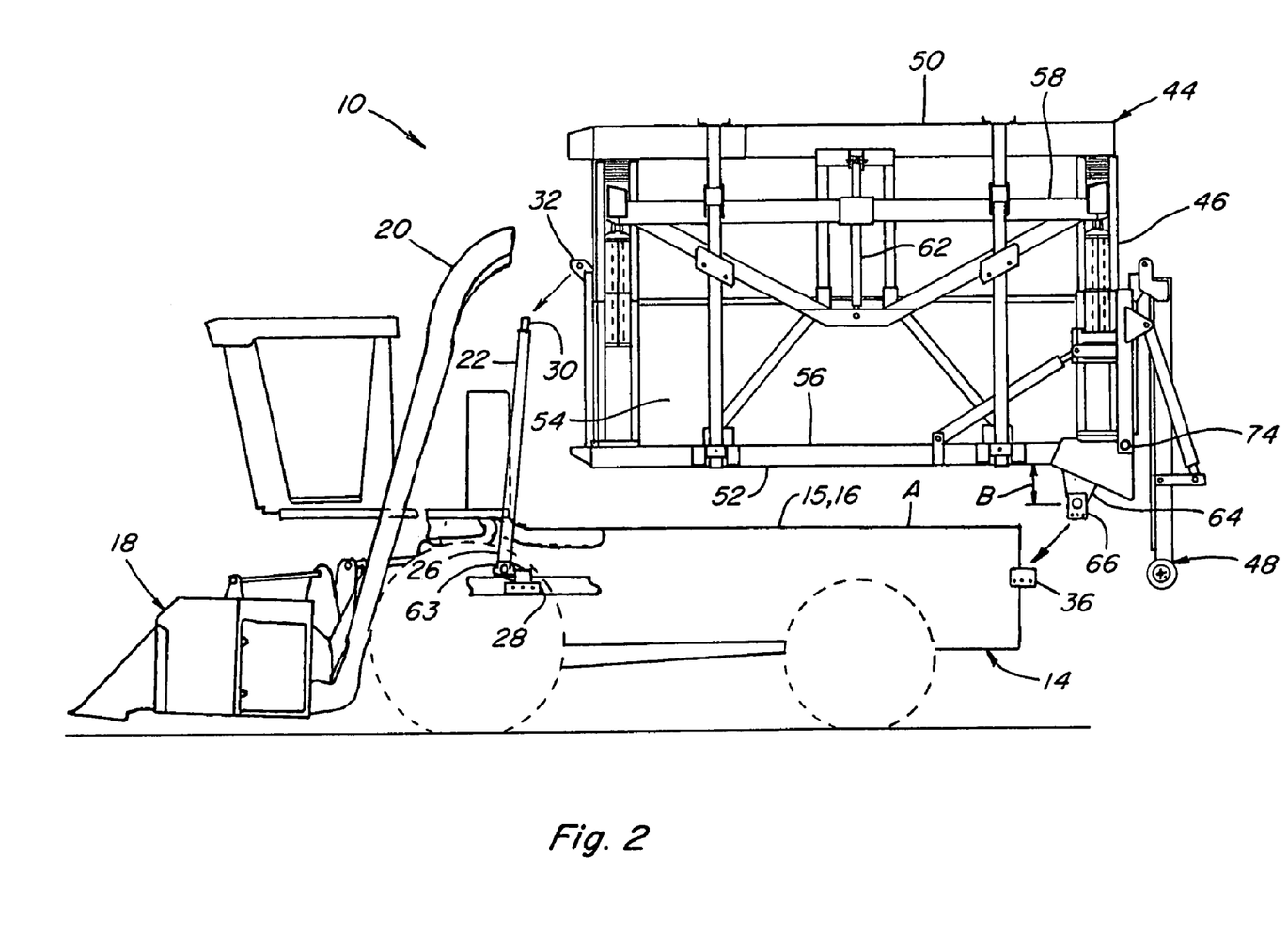
FIG. 2 is a simplified side view of a cotton packager of the invention, illustrating installation of the packager on the cotton harvester of FIG. 1.

As discussed above in the Background Art section, a disadvantage of using cotton receiving baskets, such as basket 12, is that they typically do not facilitate unloading of the cotton in a cohesive, unitary form onto the ground or other surface. Thus, the cotton requires additional time-consuming handling. This has led to the development of cotton packagers which will package the cotton in a unitary body which will retain its shape when removed from the packager so as to be transportable in that form to a gin or other location for processing or storage. Presently, both baskets, such as basket 12, and cotton packagers such as a packager 44 shown in FIG. 2 are in demand. For ease of manufacture, and cost advantages, it is desirable to have the capability for installing the cotton packager, such as packager 44, on a chassis of a cotton harvester, such as chassis 14 of harvester 10, interchangeably, or nearly interchangeably, with a cotton receiving basket, such as basket 12. In mounting a cotton packager such as packager 44 on a chassis, such as chassis 14, of a harvester, such as harvester 10, it would also be desirable to facilitate unloading cotton therefrom.

Referring to FIG. 2, according to the preferred aspect of the invention, cotton packager 44 includes elements so as to be mountable on chassis 14 of harvester 10, interchangeably with basket 12. According to still further aspects of the invention, the mounting of packager 44 additionally facilitates unfolding operation of an unloader door 48 optionally mounted on an open rear end 46 of packager 44. More particularly, it is desirable for packager 44 to be positioned and supported on upper portions 16 of structural elements 15 when in an operating position, in essentially the same manner as basket 12 is supported thereon, but, instead of being raiseable therefrom in a horizontal orientation for unloading, it is desirable for packager 44 to be tilted upward in front and downward toward the rear for unloading the unitary body or module of cotton through open rear end 46 of packager 44, over unloader door 48, onto a surface therebelow, as best shown schematically in FIG. 6. In this regard, it is optimally desirable for a front end of packager 44 to be pivotally connectable to upper rod end 30 of front fluid cylinder 22, and for cylinder 22 to be pivotally mountable to harvester 10, not fixedly as with basket 12. It is desirable for a rear end of packager 44 to be mountable to the lower rear bracket 36 on chassis 14, so as to be positionable in an operating position on upper portions 16 of structural elements 15, and to be tiltable to the unloading position of FIG. 6 by extension of front fluid cylinder 22 and pivotal movement about lower rear bracket 36.

Figure 6:
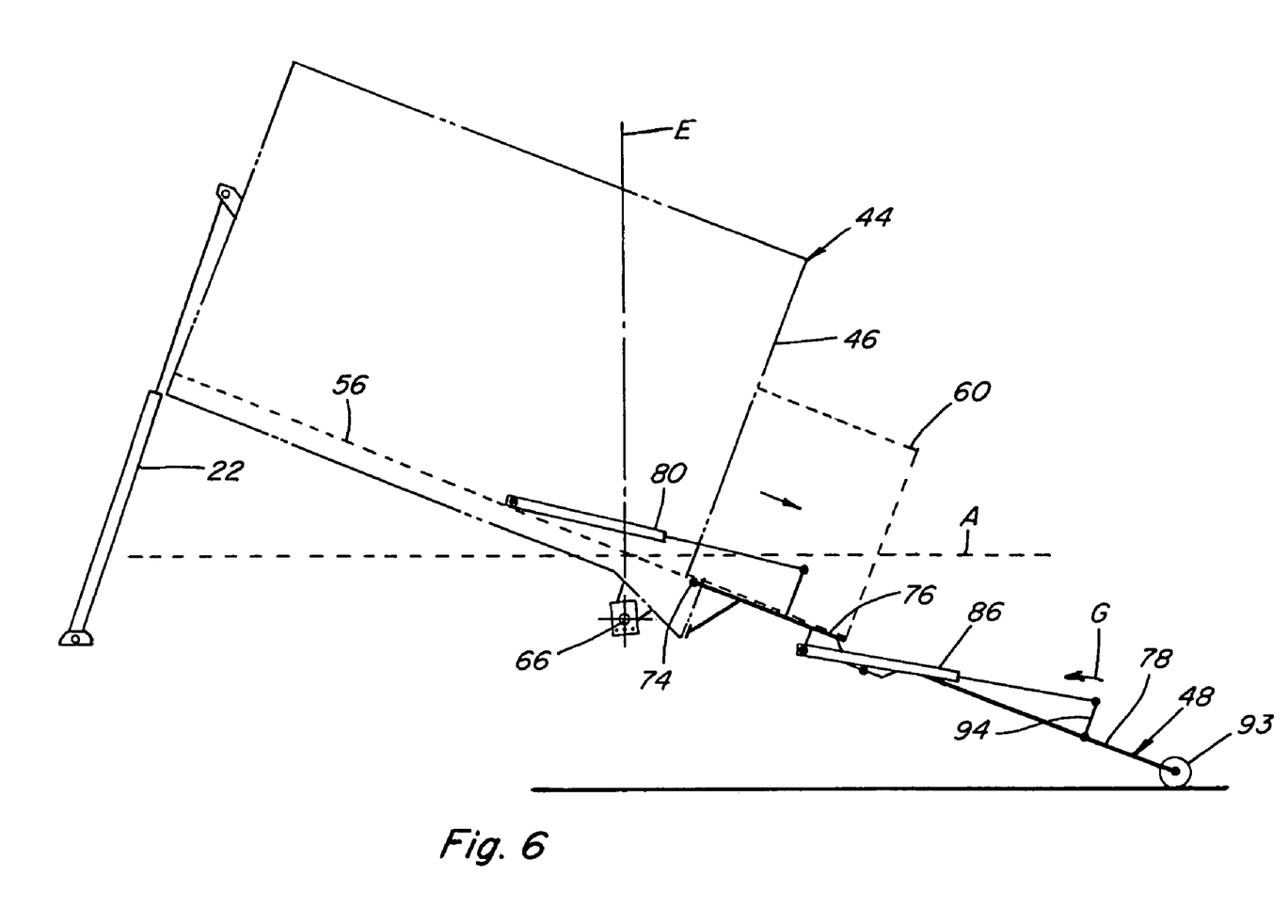
FIG. 6 is another simplified schematic representation of the packager, shown in a tilted unloading position and a compacted cotton module being unloaded therefrom onto the unloader door, which is in a fully unfolded open or unloading position.

Referring again to FIG. 2, packager 44 includes a cotton compacting structure 50 having a bottom portion 52 adapted to be supported on upper portions 16 of structural elements 15 of chassis 14, in essentially the same manner as basket 12. Compacting structure 50 includes a cotton compacting chamber 54 adapted for receiving harvested cotton propelled from row units 18 through ducts 20, and a floor 56 located in chamber 54. Structure 50 additionally includes a cotton compactor 58 in an upper region thereof and drivable downwardly toward floor 56 against cotton collected in a lower region of chamber 54, for compacting the cotton into a unitary body or module 60 (FIG. 6). Compactor 58 is driven downwardly against collected cotton in chamber 54 by suitable drivers, here represented by a compactor fluid cylinder 62 connected between an upper portion of structure 50 and side structure of compactor 58.

A compacted cotton module fully formed by packager 44 can be anticipated to weigh up to 11,000 pounds, be about 16 feet in length, and have height and width dimensions each from about 6 to about 9 feet. It is desirable to have the capability for unloading such a module from a packager 44 in a manner which maintains the integrity of the module, such that forces are not applied thereto which would tend to tear the module apart or otherwise reduce its integrity.

To facilitate unloading of a completed cotton module from packager 44, while maintaining its integrity, onto a surface on which harvester 10 is located, such as the ground or the like, it is desirable for door 48 to extend in at least substantially coplanar relation to floor 56 when packager 44 is tilted to an unloading position (FIG. 6), and in this regard, to facilitate unloading, it is desirable for rear end 46 of packager 44 to be closer to the surface onto which the module is to be unloaded when the packager is in the tilted position, compared to when in the operating position of FIG. 2.

To facilitate connection of packager 44 to chassis 14 in the above-described manner for basket 12, while allowing pivotal movement of the packager as desired for unloading of a cotton module therefrom, as noted above, bottom portion 52 of compacting structure 50 is adapted to rest on upper portions 16 of structural elements 15 of chassis 14 in essentially the same manner as basket 12, such that floor 56 will be located above and generally parallel to reference plane A and bottom portion 52 will rest along reference plane A. The front end of structure 50 will additionally include a front upper bracket 32 adapted for pivotal connection to upper rod end 30 of a front fluid cylinder 22. It should be noted here that the front rail or mast structure that bolted to bracket 28 for preventing the basket 12 and cylinder 22 from swaying or tilting is removed since it is part of the basket structure. A cylinder support structure 63 is bolted to bracket 28 where the rail or mast structure of basket 12 was bolted and lower end 26 of fluid cylinder 22 is pinned to cylinder support structure 63, such that cylinder 22 will be pivotable relative to bracket 28, for lifting or raising the front end of packager 44 by extension of front fluid cylinder 22. Structure 50 additionally includes at least one, and preferably two, parallel pivot arms 64 extending downwardly about the predetermined distance B from bottom portion 52 to a packager pivot bracket 66 positioned for connection to lower rear bracket 36, for pivotal movement of packager 44 about a pin of packager pivot bracket 66 between an operating position with bottom portion 52 disposed along reference plane A on upper portions 16 of structural elements 15, and the unloading position of FIG. 6.

Figure 2A:
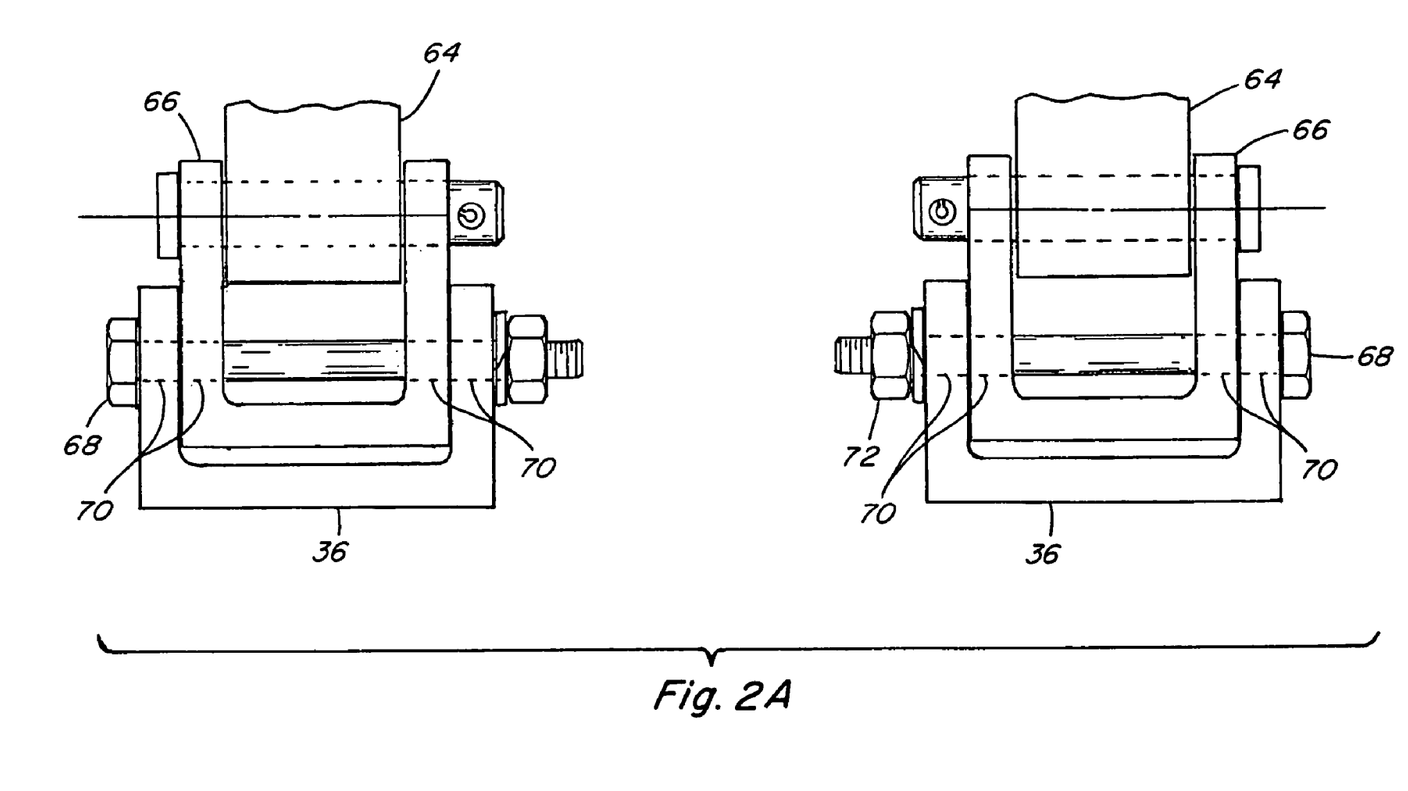
FIG. 2A is a fragmentary rear view of the packager of FIG. 2, installed on the chassis of the cotton harvester of FIG. 1.
Figure 2B:
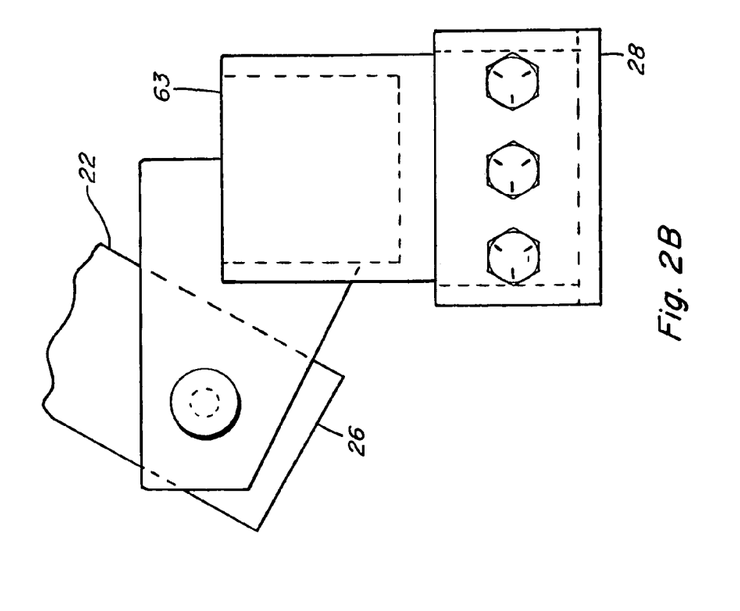
FIG. 2B is a fragmentary side view of the front of the chassis of the cotton harvester with the front fluid cylinder and connecting bracket of the packager installed on the chassis.
Figure 2C:
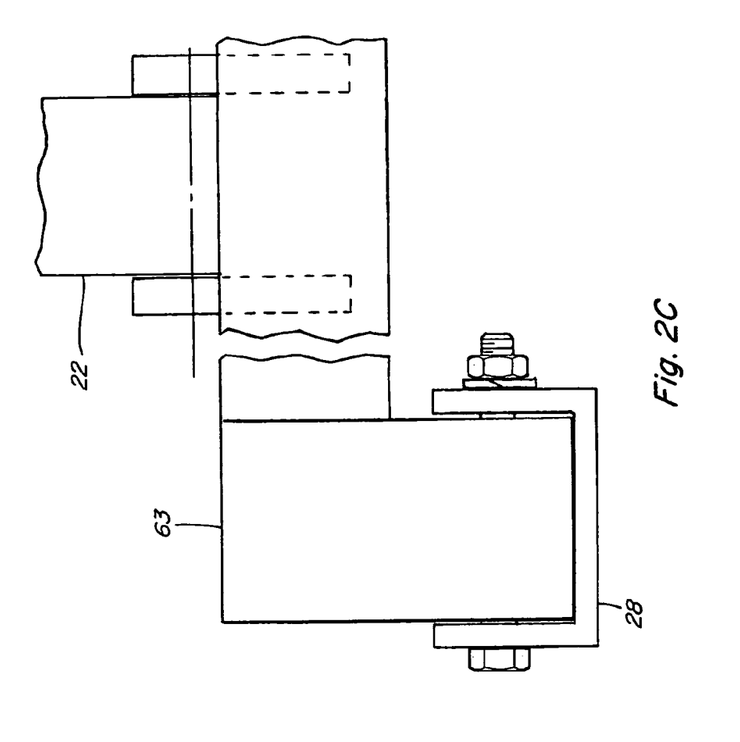
FIG. 2C is a fragmentary rear view of the front of the chassis of the cotton harvester with the front fluid cylinder and connecting bracket of the packager installed on the chassis.

Referring also to FIG. 2A, each packager pivot bracket 66 is preferably connectable to bracket 36 using one or more fasteners such as screws or bolts, such as an array of three bolts 68, which pass through aligned holes 70 through a lower end of pivot bracket 66 and bracket 36, and are securable with nuts 72. In a similar manner, the lower end 34 of cylinder 24 in FIG. 1 is bolted directly to bracket 36 using the center of alignment holes 70. And stated previously, cylinder support structure 63 is bolted into bracket 28 where the rail and mast structure of basket 12 was mounted and cylinder 22 is pinned to cylinder support structure 63 as shown in FIGS. 2B and 2C.

Referring also to FIGS. 3, 4, 5 and 6, unloader door 48 is preferably pivotally connected to rear end 46 of packager 44 by a door pivot 74. Door pivot 74 is preferably located a predetermined distance C rearwardly of packager pivot 66 at about the level of, or just below, floor 56, as denoted by line D. Predetermined distance C can have a value, for instance, in a range of from about 15 to 19 inches. Door 48 is preferably a multi-segment assembly, including a first door segment 76 and a second door segment 78. A first end portion of first door segment 76 is connected by door pivot 74 to packager 44, and is pivotally movable from a closed position (FIGS. 2 and 3) through a range of partially open positions (FIGS. 4 and 5) to a fully open position (FIG. 6). First door segment 76 is pivotally movable between its closed and open positions by a first door fluid cylinder 80 having one end connected by a pivotal connection 82 to packager 44, and an opposite end connected by a pivotal connection 84 to door segment 76. A second door fluid cylinder 86 is connected by a pivotal connection 88 to first door segment 76, and by a pivotal connection 90 to a pivoting link arm 94 that is connected to second door segment 78. Link arm 94 can pivot rearward in relation to second door segment 78 as shown by arrow G but is stopped by second door segment 78 from pivoting forward. Second door segment 78 has a first end portion connected by a pivotal connection 92 to a second end portion of door segment 76, for effecting pivotal movement of second door segment 78 relative to door segment 76, as will be explained. Second door segment 78 has a ramp or wheel 93 mounted to a second end for movement along the ground.

Figure 3:
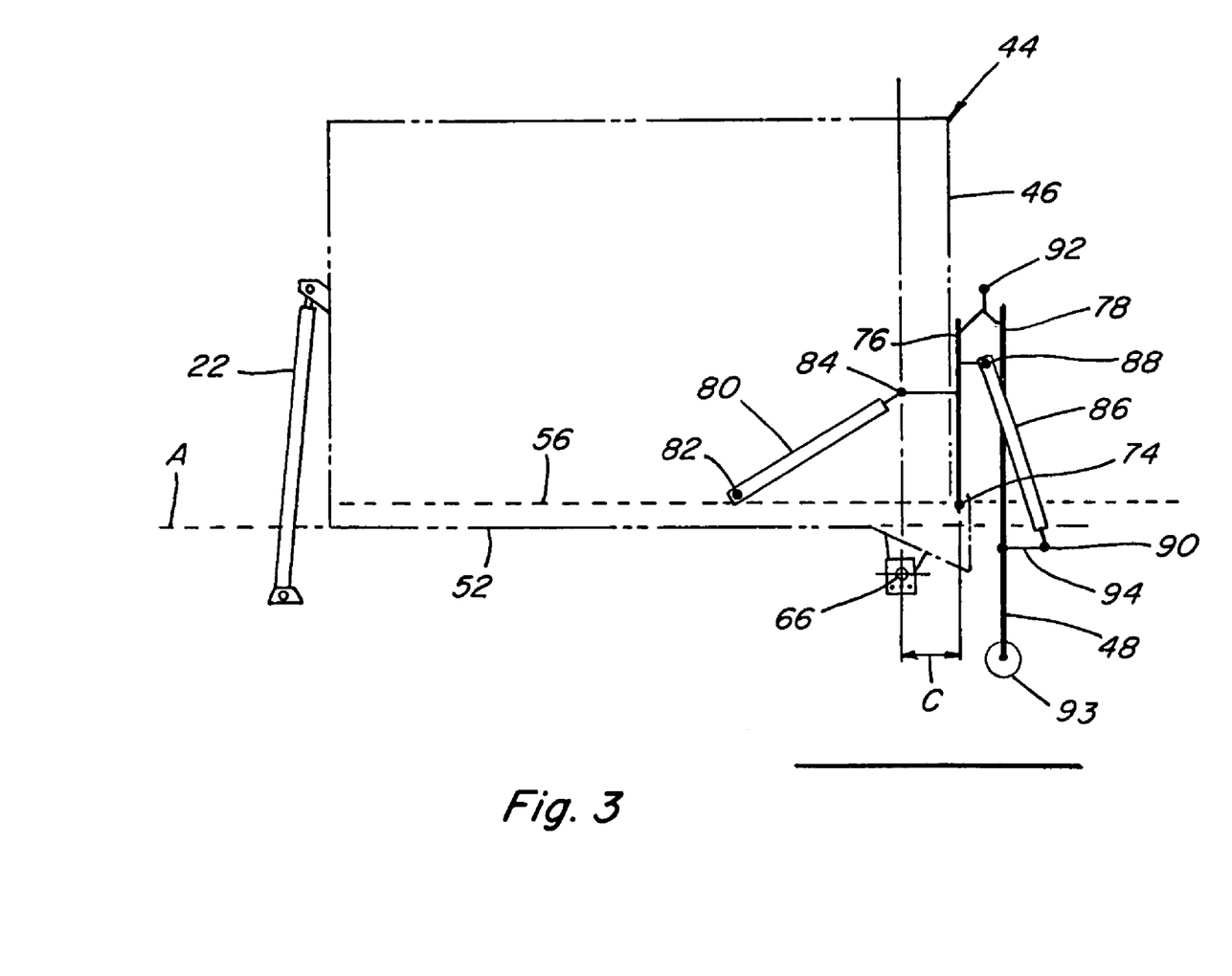
FIG. 3 is a simplified schematic representation of the cotton packager of FIG. 2, showing an unloader door thereof in a closed position.

Referring more particularly to FIG. 3, as noted above, unloader door 48 is shown in its closed position in at least partially closing relation to open rear end 46 of packager 44. In this position, fluid cylinders 80 and 86 are retracted, such that the second door segment 78 is beside or in overlaying relation to first door segment 76. Bottom portion 52 of floor 56 is supported by upper portion 16 of structural element 15, chassis 14, as shown by reference plane A.

Figure 4:
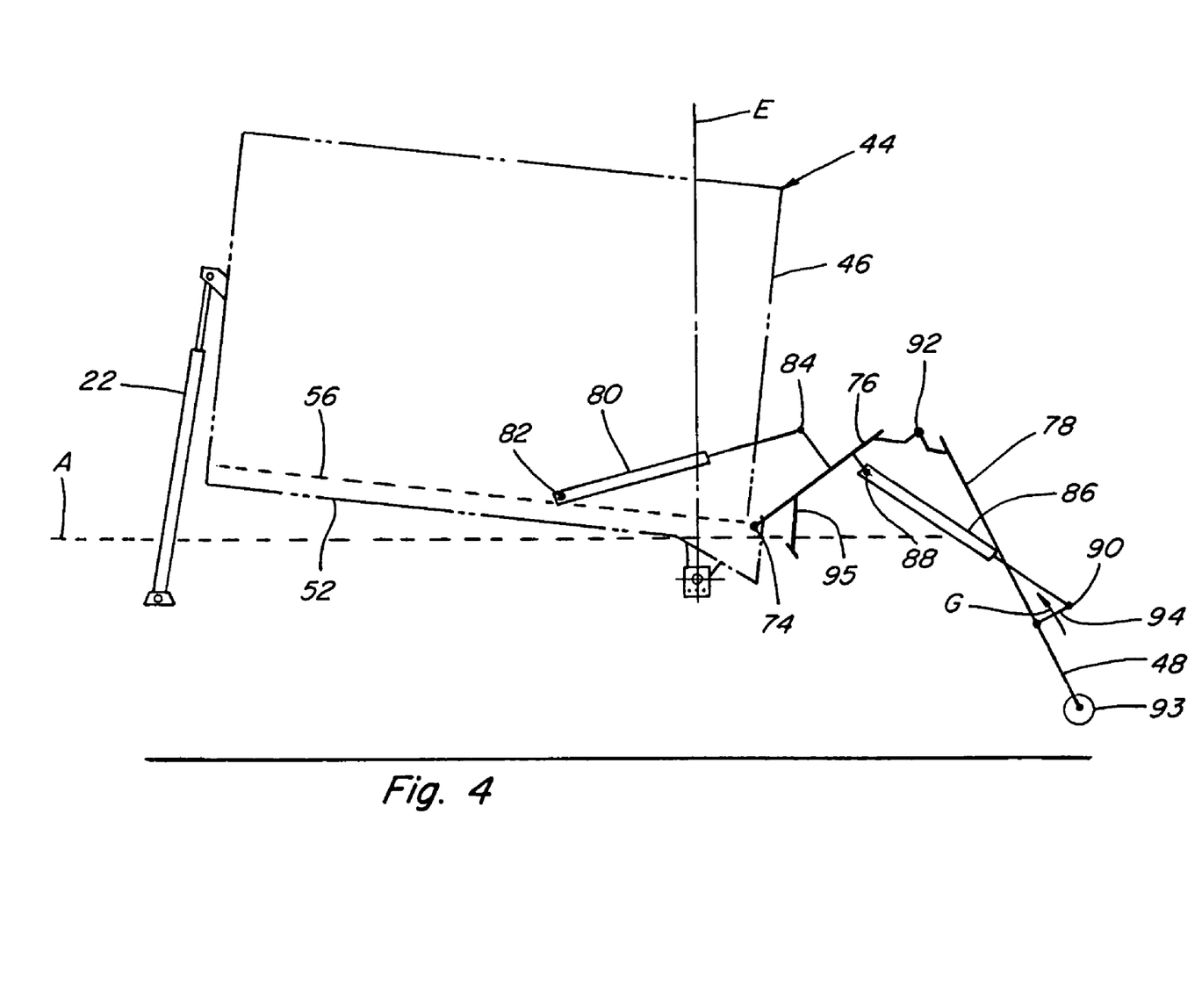
FIG. 4 is another simplified schematic representation of the packager, showing the unloader door in a partially unfolded position.

Referring more particularly to FIG. 4, initiation of an unloading sequence is illustrated. Here, door cylinders 80 and 86 are allowed to extend, such that first door segment 76 will be pivoted to the partially open position and the second end portion of second door segment 78 will have moved out away from first door segment 76. At the same time front fluid cylinder 22 is extending such that the front end of floor 56 and bottom portion 52 move up and away from reference line A as packager 44 pivots about pivot 66 and the rear portion of floor 56 along with door pivot 74 move rearward and down toward reference plane A. This allows the lower end of second door 78 along with wheel 93 to move closer to the ground.

Figure 5:
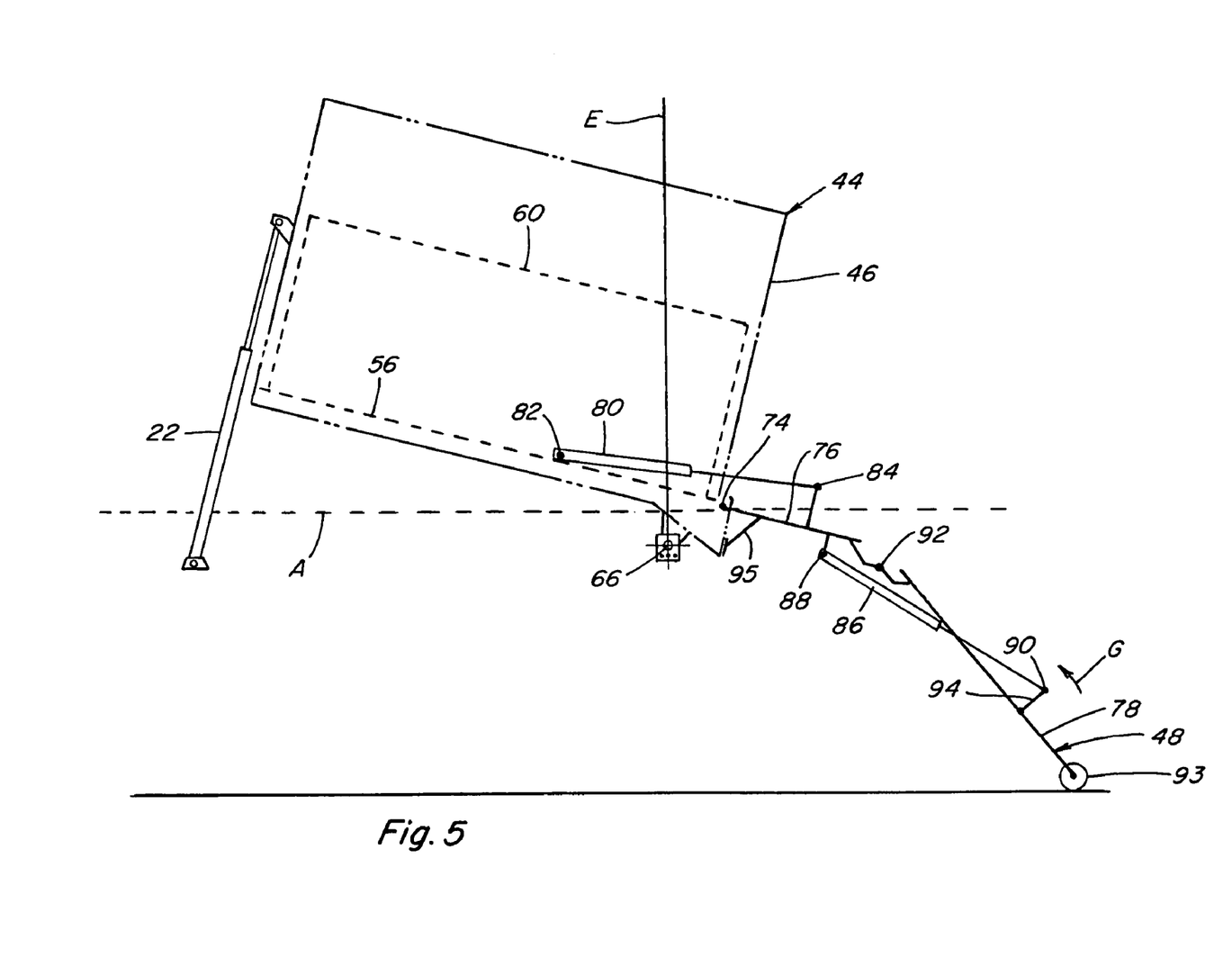
FIG. 5 is another simplified schematic representation of the packager, showing the unloader door in another partially unfolded position.

Referring more particularly to FIG. 5, fluid cylinders 80 and 86 are now fully, or nearly fully, extended, such that first door segment 76 is in its open position in line with and parallel to the floor 56 of packager 44 and supported by first door stops 95 that are attached to the end of floor 56. At this point, there should be no load on door cylinder 80. However, door segments 76 and 78 are not parallel. As shown in FIG. 5, the wheel 93 attached to the lower end of second door segment 78 is on the ground. As stated before, door cylinder 86 is fully extended. Since door cylinders 80 and 86 are master/slave cylinders with door cylinder 80 the master, then if door cylinder 80 is fully extended, door cylinder 86 has to be fully extended. At this point there is no load on door cylinder 86 since there is no more fluid going into door cylinder 86 from door cylinder 80. The ground on its lower end and door pivot 92 on its first end is now supporting second door segment 78. Since door pivot 92 is also attached to first door segment 76 that is being supported by door stop 95 the load in door stop 95 will increase but the load in packager pivot 66 will decrease since the ground is now supporting part of the second door segment 78. At this point FIG. 5 clearly shows that the second door segment 78 is not in its unload position, that is parallel and in line with floor 56 and first door segment 76. To achieve this, since door cylinder 86 is no longer extending, the additional stroke length that packager cylinder 22 has to extend to place packager 44 in its unload position will be used to push wheel 93 against the ground causing second door segment 78 to rotate counterclockwise about door pivot 92 to its unload position. This is made possible due to pivot link 94 which rotates rearward as shown by arrow G to prevent door cylinder 86 from binding as second door segment 78 rotates counterclockwise to its unload position. However, this will increase the loading on cylinder 22 but it is a compressive column loading and is small considering the lever arm from cylinder 22 to wheel 93. Cylinder 22 does not have to be as large as for the cylinders lifting basket 12 because pivot 66 and the ground are sharing part of the load and the load to push open the second door segment 78 and lift the packager is a simple column loading.

Referring more particularly to FIG. 6, fluid cylinder 22 is shown fully extended, to tilt the front end of packager 44 upwardly to the unloading position, which also causes door segments 78 to relatively pivot into substantial coplanar relation with floor 56. A cotton module 60 is shown being moved over first door segment 76 from packager 44. In this position, it can be observed that the rear end of floor 56 at open rear end 46 of packager 44 has been lowered below line D, closer to the surface onto which cotton module 60 is to be unloaded, which will facilitate unloading. A vertical center line E is shown extending through packager pivot 66 in both FIGS. 5 and 6. It can be observed that a significant portion of packager 44 is to the right of center line E in FIG. 6, which would have the effect of placing a greater portion of the weight of packager 44 to the right hand side of pivot 66, in the direction of pivotal movement of packager 44, which will resultantly lessen the compressive load exerted on fluid cylinder 22. The compressive load on fluid cylinder 22 will greatly decrease as the center of mass of cotton module 60 moves to the right of pivot 66. However the loading on pivot 66 will increase until the cotton module 60 goes onto the second door segment 78. Here the ground will begin to share some of the load of cotton module 60. As cotton module 60 moves from the second door segment 78 onto the ground the loading on pivot 66 will begin to greatly decrease. All this loading is simple shear and compressive column loading and not the torsion and bending loading that the components of basket 12 would be subject to.

Here, it should be noted that although a planar interface, represented by reference line A, between both basket 12 and packager 44, and chassis 14 is shown, that interface can have a variety of alternative shapes and configurations, as desired or required for a particular application.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A self-propelled cotton harvester, comprising:
a chassis having at least one structural element, the structural element having an upper portion defining a generally horizontal plane, the upper portion of the structural element for supporting a cotton packager thereon, the chassis having a rear end including at least one mounting element located rearwardly of the structural element and disposed a predetermined distance below the plane or the upper portion of the structural element; and
the cotton packager including cotton compacting structure having a bottom portion adapted to be supported on the upper portion of the structural element, the compacting structure including an open rear end and a cotton compacting chamber having at floor therein extending to the open rear end, the chamber containing a compactor operable for compacting the cotton received in the chamber to form a unitary body of compacted cotton within the chamber, the cotton compacting structure further including at least one pivot arm extending downwardly about the predetermined distance from the rear end of the cotton compacting structure and including a packager pivot connected to the mounting element of the chassis, to allow pivotal movement of the packager about the packager pivot between a generally horizontal position supported on the structural element of the chassis, and a tilted position wherein a front end of the packager is elevated above the chassis and a rear end of the floor is located rearwardly of and below the plane of the upper portion of the structural element of the chassis.

2. The cotton harvester of claim 1, further comprising a front fluid cylinder having an upper end pivotally connected to a front end of the cotton compacting structure, and a lower end pivotally connected to the chassis, such that extension of the fluid cylinder will tilt the packager to the tilted position.

3. The cotton harvester of claim 1, wherein the at least one structural element includes upper portions which define a horizontal plane, the floor of the cotton compacting structure being located above the plane when the packager is in the horizontal position.

4. The cotton harvester of claim 1, further comprising an unloader door mounted to the packager for pivotal movement about a door pivot between a closed position at least partially enclosing the open rear end, and an open position extending outwardly from the floor in substantially coplanar relation thereto, the cotton harvester further comprising at least one door fluid cylinder extendible from a retracted position to an extended position for pivotally moving the door from the closed position to the open position.

5. The cotton harvester of claim 4, wherein the unloader door includes a first door segment and a second door segment, the first door segment having a first end portion and an opposite second end portion, the first end portion being pivotally connected by the door pivot to the packager, the second door segment having a first end portion and an opposite second end portion, the first end portion of the second door segment pivotally connected to the second end portion of the first door segment, wherein when the door is pivoted to the open position, the second door segment will be pivoted downwardly to a surface below the door, such that when the packager is pivoted to the tilted position with the door in the open position, the first door segment will be pivoted into substantially parallel, coplanar relation to the second door segment.

6. The cotton harvester of claim 4, wherein the predetermined distance is 20 inches, and a second predetermined distance is about 17 inches.

7. The cotton harvester of claim 1, wherein the predetermined distance is about 20 inches.

8. The cotton harvester of claim 1, wherein the packager pivot is connected by at least one fastener to the mounting element of the chassis.

9. The cotton harvester of claim 1, wherein the packager is connected to the chassis by the at least one pivot arm and a fluid cylinder, the fluid cylinder extending between a front end of the packager and the chassis.

10. A self-propelled cotton harvester, comprising:
   a chassis including at least one structural element having an upper portion defining a generally horizontal plane, the upper portion of the structural element for supporting a cotton packager thereon, the chassis having a rear end including at least one mounting element disposed a predetermined distance below the plane of the upper portion of the structural element;
   a cotton packager including a cotton compacting structure having a bottom portion adapted to be supported on the upper portion of the structural element, the compacting structure including a cotton compacting chamber, an open rear end in connection with the chamber, and a floor located in the chamber extending to the open rear end, the chamber containing a compactor operable for compacting the cotton received in the chamber to form a unitary body of compacted cotton within the chamber; and
   at least one pivot arm extending downwardly about the predetermined distance from a rear end of the bottom portion of the cotton compacting structure, the at least one pivot arm extending generally beneath the open end of the chamber to a packager pivot connected to the mounting element of the chassis, the at least one pivot arm allowing pivotal movement of the packager about the packager pivot between a generally horizontal position supported on the structural element of the chassis, and a tilted position wherein a front end of the packager is elevated above the horizontal plane of the chassis and a rear end of the floor is located rearwardly of and below the plane of the upper portion of the structural element of the chassis.

11. The cotton harvester of claim 10, further comprising a front fluid cylinder having an upper end pivotally connected to a front end of the cotton compacting structure and a lower end connected to a front mounting element on the chassis, such that extension of the fluid cylinder will tilt the packager to the tilted position.

12. The cotton harvester of claim 10, wherein the upper portion of the at least one structural element of the chassis defines a horizontal plane, the floor of the cotton compacting structure being located above the plane when the packager is in the horizontal position.

13. The cotton harvester of claim 10, further comprising an unloader door mounted to the packager for pivotal movement about a door pivot between a closed position at least partially enclosing the open rear end, and an open position extending outwardly from the floor in substantially coplanar relation thereto, the cotton harvester further comprising at least one door fluid cylinder extendible from a retracted position to an extended position for pivotally moving the door from the closed position to the open position.

14. The cotton harvester of claim 13, wherein the unloader door includes a first door segment and a second door segment, the first door segment having a first end portion and a second opposite end portion, the first end portion being pivotally connected by the door pivot to the packager, the second door segment having a first end portion and an opposite second end portion, the first end portion of the second door segment being pivotally connected to the second end portion of the first door segment, wherein when the door is pivoted to the open position, the second door segment will be pivoted downwardly to a surface below the door, such that when the packager is pivoted to the tilted position with the door in the open position, the first door segment will be pivoted into substantially parallel, coplanar relation 10 the second door segment.

15. The cotton harvester of claim 13, wherein the predetermined distance is about 20 inches, and a second predetermined distance is about 17 inches.

16. The cotton harvester of claim 10, wherein the predetermined distance is about 20 inches.

17. The cotton harvester of claim 10, wherein the packager pivot is connected by at least one fastener to the mounting element of the chassis.

* * * * *